(12) United States Patent  
Parks et al.

(10) Patent No.: US 8,671,967 B2
(45) Date of Patent: Mar. 18, 2014

(54) RELIEF VALVE

(75) Inventors: Brent Parks, Englewood, CO (US); Matthew A. Cox, Centerville, UT (US); Bradley W. Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 951 days.

(21) Appl. No.: 12/797,827

(22) Filed: Jun. 10, 2010

(65) Prior Publication Data

US 2011/0030941 A1 Feb. 10, 2011

Related U.S. Application Data

(60) Provisional application No. 61/232,215, filed on Aug. 7, 2009.

(51) Int. Cl.
*F16K 17/40* (2006.01)
*F25B 49/02* (2006.01)
*F25B 45/00* (2006.01)

(52) U.S. Cl.
USPC .............. 137/68.13; 137/625.48; 62/149

(58) Field of Classification Search
USPC ............ 137/68.13, 625.48, 625.49; 62/149
See application file for complete search history.

(56) References Cited

U.S. PATENT DOCUMENTS

| | | | |
|---|---|---|---|
| 2,365,364 A * | 12/1944 | Temple | 137/68.13 |
| 2,959,326 A | 11/1960 | Pouliot | |
| 3,093,151 A * | 6/1963 | Merkowitz | 137/68.19 |
| 3,111,133 A * | 11/1963 | Fulton et al. | 137/68.13 |
| 3,202,162 A * | 8/1965 | Eckardt et al. | 137/68.13 |
| 3,330,440 A | 7/1967 | Summers et al. | |
| 3,416,548 A * | 12/1968 | Bach et al. | 137/68.13 |
| 3,478,760 A * | 11/1969 | Hosek | 137/68.13 |
| 3,495,615 A | 2/1970 | Ehrens et al. | |
| 3,548,848 A * | 12/1970 | Stichling | 137/68.13 |
| 3,638,669 A * | 2/1972 | Feight et al. | 137/68.23 |
| 3,757,810 A * | 9/1973 | Covarrubias | 137/68.13 |
| 3,889,703 A * | 6/1975 | Keathley | 137/68.13 |
| 3,892,253 A * | 7/1975 | Covarrubias | 137/68.13 |
| 3,897,799 A * | 8/1975 | Lee | 137/68.13 |
| 3,983,897 A | 10/1976 | Gebelius | |
| 4,111,221 A | 9/1978 | Olsen | |
| 4,288,005 A * | 9/1981 | Soo-Hoo | 137/68.13 |
| 4,409,879 A | 10/1983 | Cobb, Jr. | |
| 4,421,005 A | 12/1983 | Byrne | |
| 4,478,150 A | 10/1984 | Sayler et al. | |
| 4,570,658 A * | 2/1986 | Dean et al. | 137/68.13 |
| 4,821,775 A | 4/1989 | Cooksey | |
| 5,305,914 A * | 4/1994 | Hoo et al. | 137/68.13 |

(Continued)

OTHER PUBLICATIONS

International Search Report and Written Opinion of the International Searching Authority for International Application No. PCT/US2010/043708, dated Sep. 30, 2010.

*Primary Examiner* — John Rivell
(74) *Attorney, Agent, or Firm* — Harness, Dickey & Pierce, P.L.C.

(57) ABSTRACT

A relief valve is provided and may include a housing having a first inlet port and a second inlet port. An initiator may be disposed within the housing and an engagement member may be slideably disposed within the housing and may be moveable between a retracted position and an extended position under force of the initiator. The engagement member may include a first bore aligned with the first inlet port in the extended position and a second bore aligned with the second inlet port in the extended position.

6 Claims, 9 Drawing Sheets

(56) References Cited

U.S. PATENT DOCUMENTS

| | | |
|---|---|---|
| 5,443,088 A | 8/1995 | Hoch et al. |
| 5,984,645 A | 11/1999 | Cummings |
| 6,240,738 B1 | 6/2001 | Kato et al. |
| 6,516,623 B1 | 2/2003 | Collier |
| 6,907,817 B2 | 6/2005 | Parks |
| 6,912,860 B2 | 7/2005 | Zima et al. |
| 7,044,151 B2 | 5/2006 | Evans |
| 7,063,019 B2 | 6/2006 | Parks et al. |
| 7,093,451 B2 | 8/2006 | Mu et al. |
| 7,182,191 B2 | 2/2007 | Scott et al. |
| 7,373,944 B2 | 5/2008 | Smith et al. |
| 7,419,184 B2 | 9/2008 | Green et al. |
| 2006/0016475 A1 | 1/2006 | Hirota |
| 2006/0027120 A1 | 2/2006 | Smith |
| 2006/0137742 A1 | 6/2006 | Smith et al. |
| 2009/0032113 A1 | 2/2009 | Cox et al. |

* cited by examiner

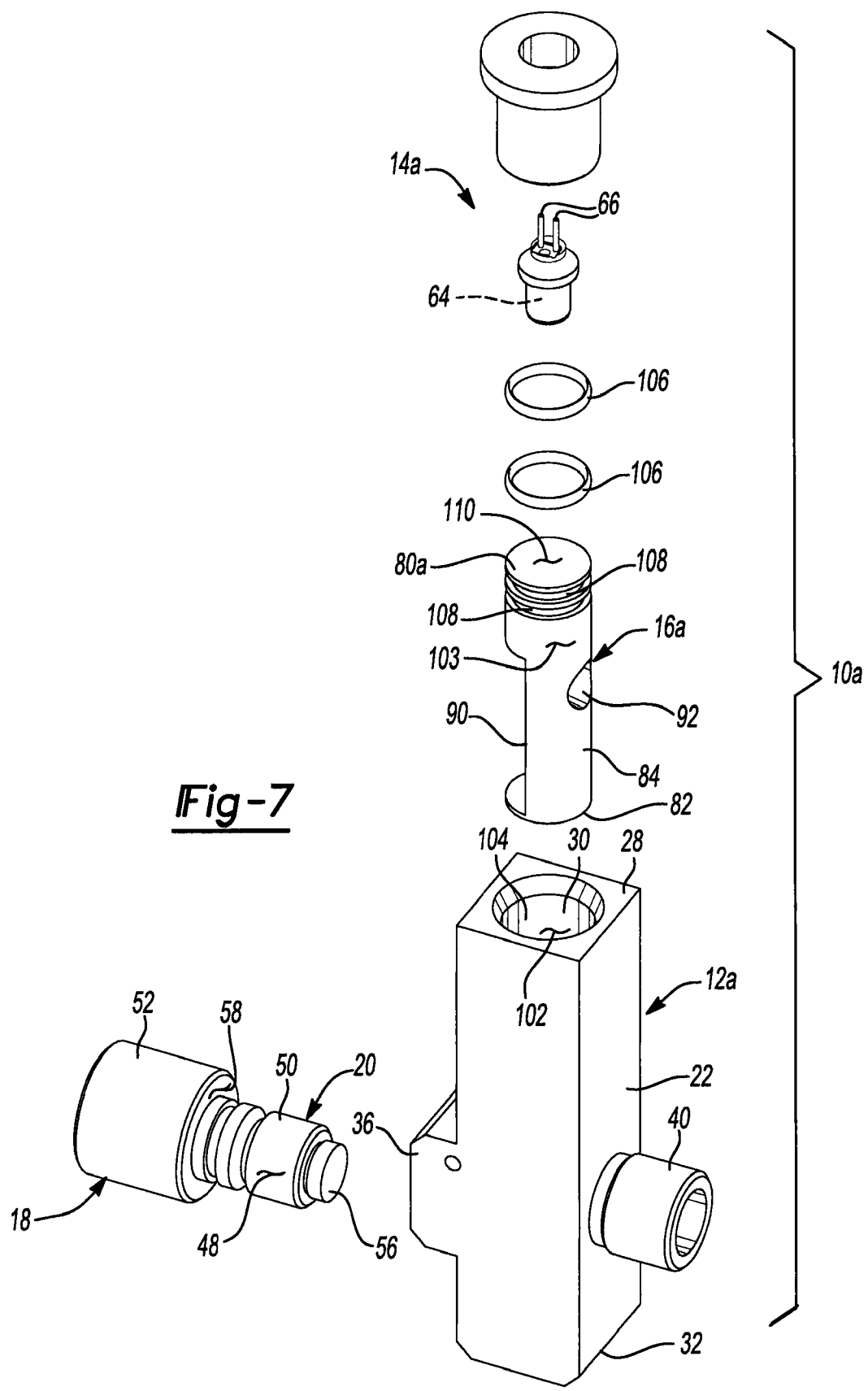

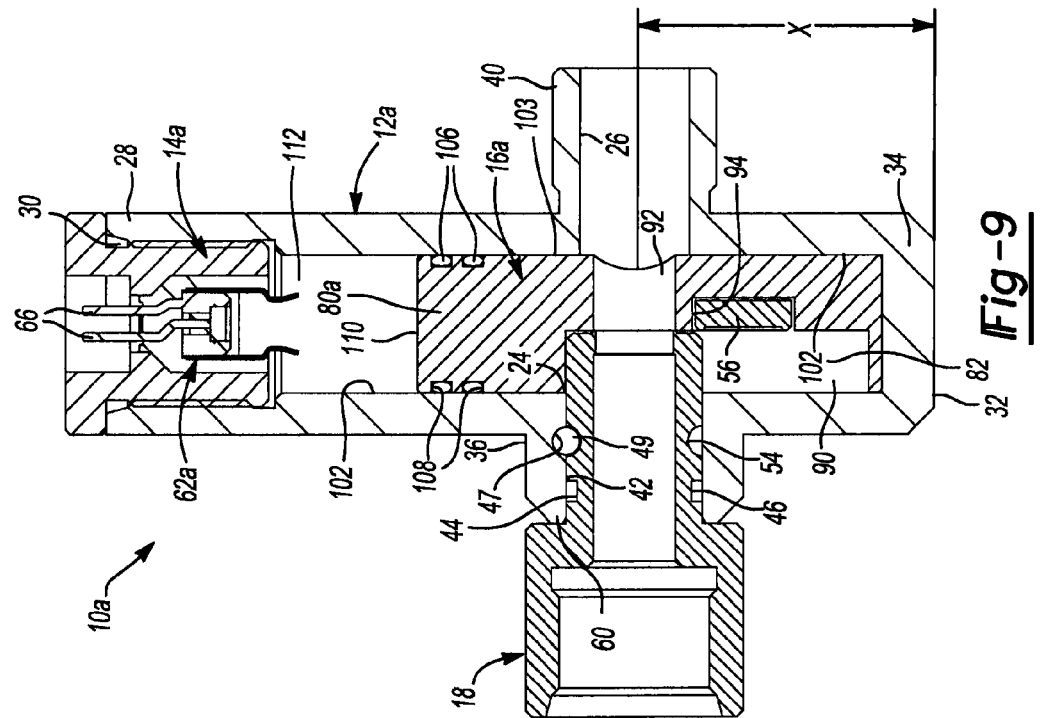
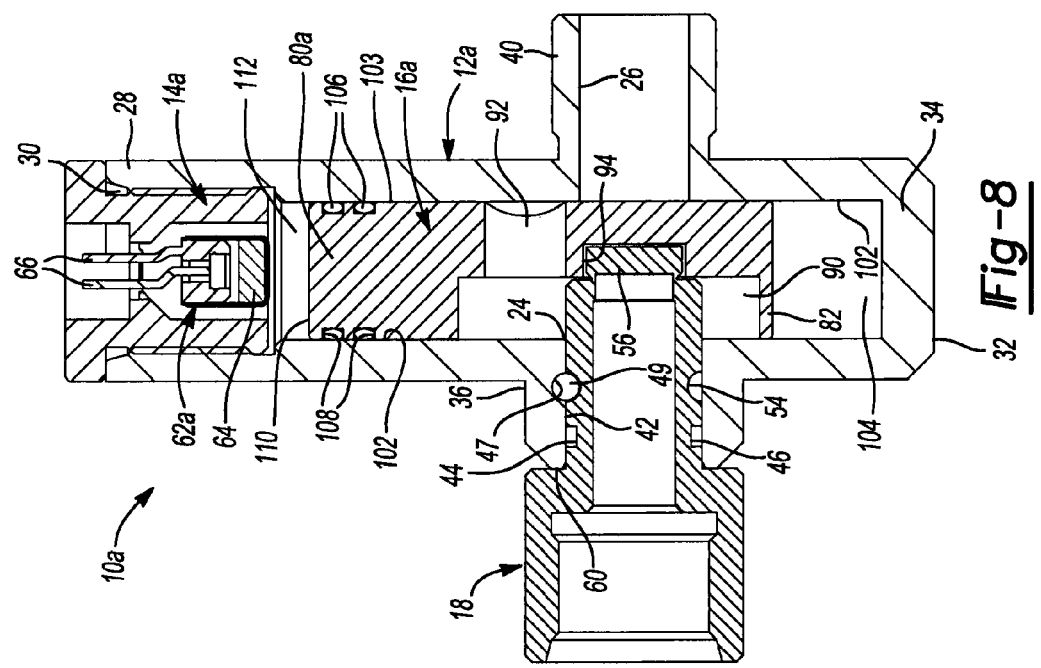

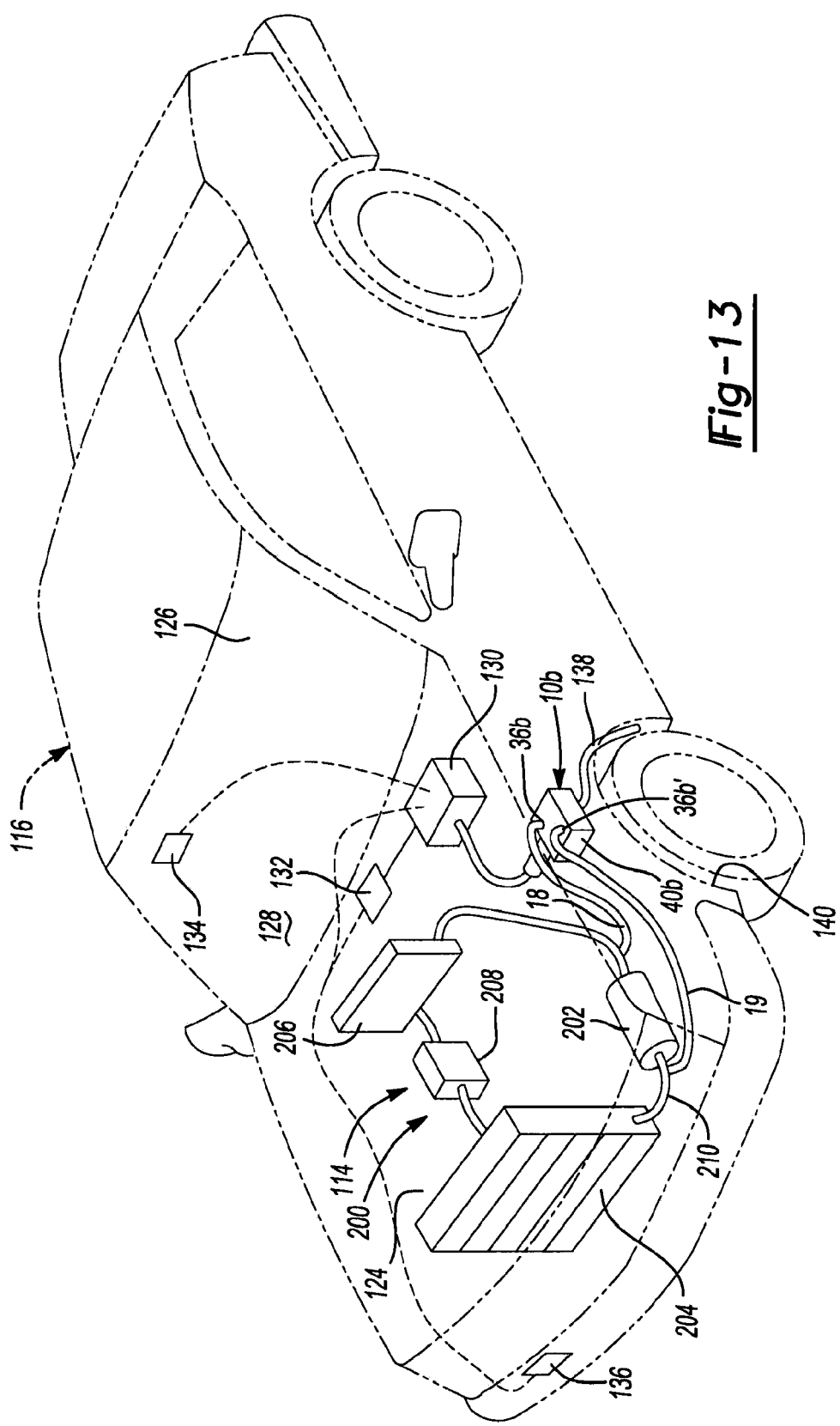

RELIEF VALUE

CROSS-REFERENCE TO RELATED APPLICATIONS

This application claims the benefit of U.S. Provisional Application No. 61/232,215, filed on Aug. 7, 2009. The entire disclosure of the above application is incorporated herein by reference.

FIELD

The present disclosure relates to valves and more particularly to relief valves.

BACKGROUND

The statements in this section merely provide background information related to the present disclosure and may not constitute prior art.

Relief valves may be associated with a fluid conduit of a system to selectively vent a fluid disposed within the conduit. For example, a relief valve may be associated with a conduit of a closed-loop system such as, for example, a refrigeration system that selectively vents a refrigerant disposed within the conduit. The relief valve may selectively vent the conduit when the refrigeration system experiences a fault condition such as, for example, over pressurization. The relief valve may vent such a closed-loop system to allow the refrigerant disposed within the refrigeration system to escape and be directed away from occupants disposed within an area to be heated and/or cooled.

Relief valves are currently implemented in automotive heating, ventilation, and air conditioning (HVAC) systems to vent refrigerant contained within the automotive HVAC system, should a fault condition arise within the system. The relief valve may be positioned within an engine compartment of a vehicle such that, upon actuation, the relief valve vents the HVAC system and allows the refrigerant to escape into the engine compartment and away from a passenger compartment of the vehicle.

While conventional relief valves have proven to adequately vent refrigerant from closed-loop systems, such relief valves must be in fluid communication with a conduit of the closed-loop system and, therefore, increase the overall number of joints of the system. Increasing the number of joints of the system increases potential leak points and the overall cost of the system.

SUMMARY

A relief valve is provided and may include a housing having a first inlet port and a second inlet port. An initiator may be disposed within the housing and an engagement member may be slideably disposed within the housing and may be moveable between a retracted position and an extended position under force of the initiator. The engagement member may include a first bore aligned with the first inlet port in the extended position and a second bore aligned with the second inlet port in the extended position.

A system is provided and may include a first conduit and a second conduit. A housing may receive at least a portion of the first conduit therein and a portion of the second conduit therein. An engagement element may be slideably disposed within the housing between a retracted position and an extended position and may shear the portion of the first conduit and the portion of the second conduit when moved from the retracted position to the extended position to place the first conduit and the second conduit in fluid communication with the housing.

Further areas of applicability will become apparent from the description provided herein. It should be understood that the description and specific examples are intended for purposes of illustration only and are not intended to limit the scope of the present disclosure.

DRAWINGS

The drawings, in which the various views are drawn to scale, described herein are for illustration purposes only and are not intended to limit the scope of the present disclosure in any way.

FIG. 7 is an exploded view of the relief valve of FIG. 6;

FIG. 8 is cross-sectional view of the relief valve of FIG. 6 showing an engagement member in a pre-deployed state;

FIG. 9 is a cross-sectional view of the relief valve of FIG. 1 showing an engagement member in a deployed state;

FIG. 13 is a perspective view of a vehicle incorporating a relief valve in accordance with the principles of the present teachings into an automotive HVAC system.

DETAILED DESCRIPTION OF VARIOUS ASPECTS

Figure 1:
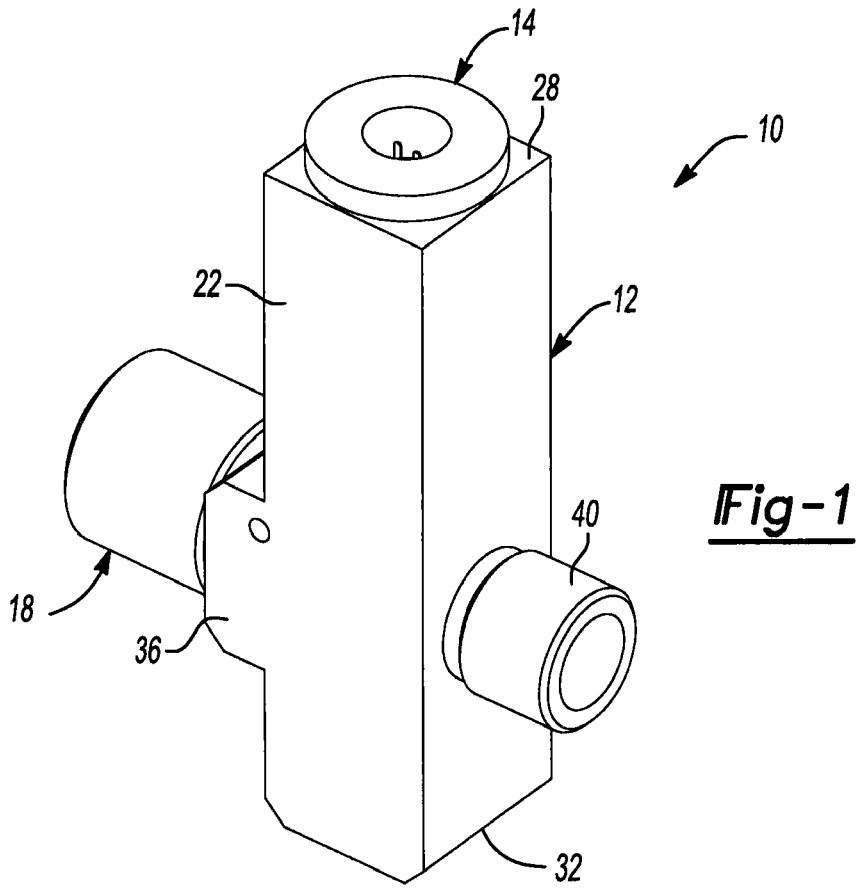
FIG. 1 is a perspective view of a relief valve in accordance with the principles of the present teachings.

The following description is merely exemplary in nature and is not intended to limit the present disclosure, application, or uses.

With reference to the figures, a relief-valve assembly 10 is provided and includes a housing 12, an actuation device 14, and an engagement element 16. The relief-valve assembly 10 may be used with a conduit 18 and may selectively shear a portion of the conduit 18 to vent a fluid disposed within the conduit 18. The conduit 18 may be a component of a closed-loop system such as, for example, a refrigeration system or a heating, ventilation, and air conditioning (HVAC) system that carries and distributes refrigerant within the refrigeration system or HVAC system. While the relief-valve assembly 10 will be described and shown in the drawings as being associated with a conduit 18 of a refrigeration system such as a HVAC system, the relief-valve assembly 10 of the present teachings could be used with any conduit to selectively vent a fluid disposed within the conduit.

The housing 12 may include a unitary construction that receives an end 20 of the conduit 18. Alternatively, the housing 12 may include a multi-part construction that is matingly received by the conduit 18 and is attached to the end 20. While the housing 12 may include a unitary construction or a multi-part construction, the housing 12 will be described hereinafter and shown in the drawings as including a unitary construction.

The housing 12 may include a main body 22, an inlet 24, and an outlet 26. The main body 22 may include a first end 28 having an opening 30 and a second end 32 disposed at an opposite end of the main body 22 from the first end 28. The second end 32 may include an end wall 34 that generally closes the second end 32 of the main body 22.

The inlet 24 may be disposed between the first end 28 and the second end 32 of the main body 22 and may include an inlet port 36 that extends from the main body 22. The outlet 26 may likewise be disposed between the first end 28 and the second end 32 of the main body 22 and may include an outlet port 40 that extends from the main body 22. Each of the ports 36, 40 may include a generally circular cross-section, whereby the inlet port 36 is sized to slideably accommodate the end 20 of the conduit 18.

Figure 4:
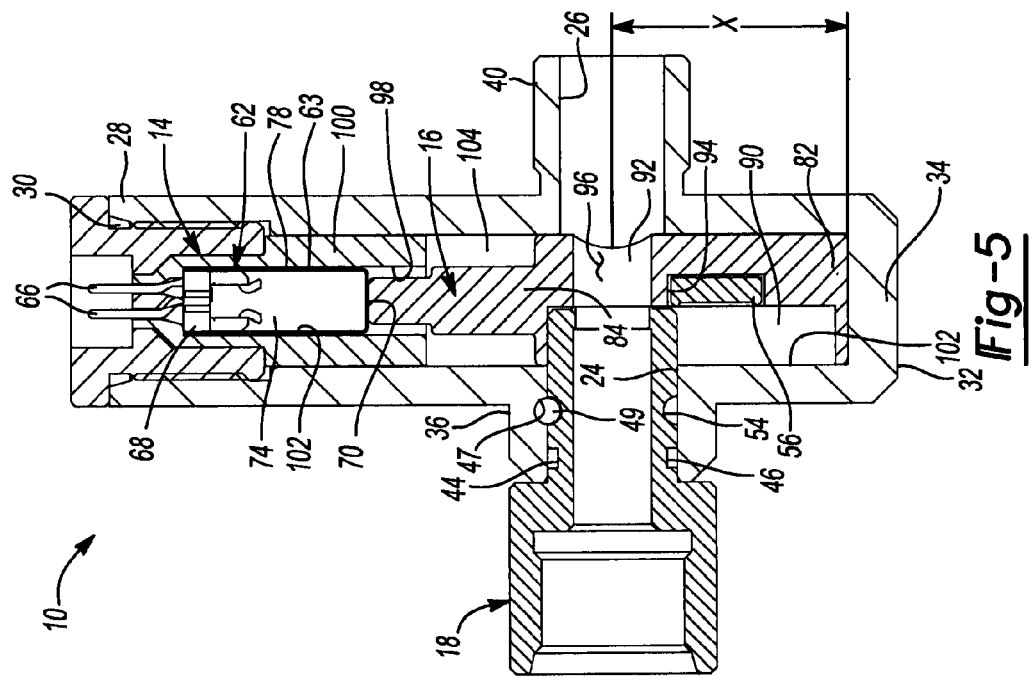
FIG. 4 is a cross-sectional view of the relief valve of FIG. 1 showing an engagement member in a pre-deployed state.
Figure 5:
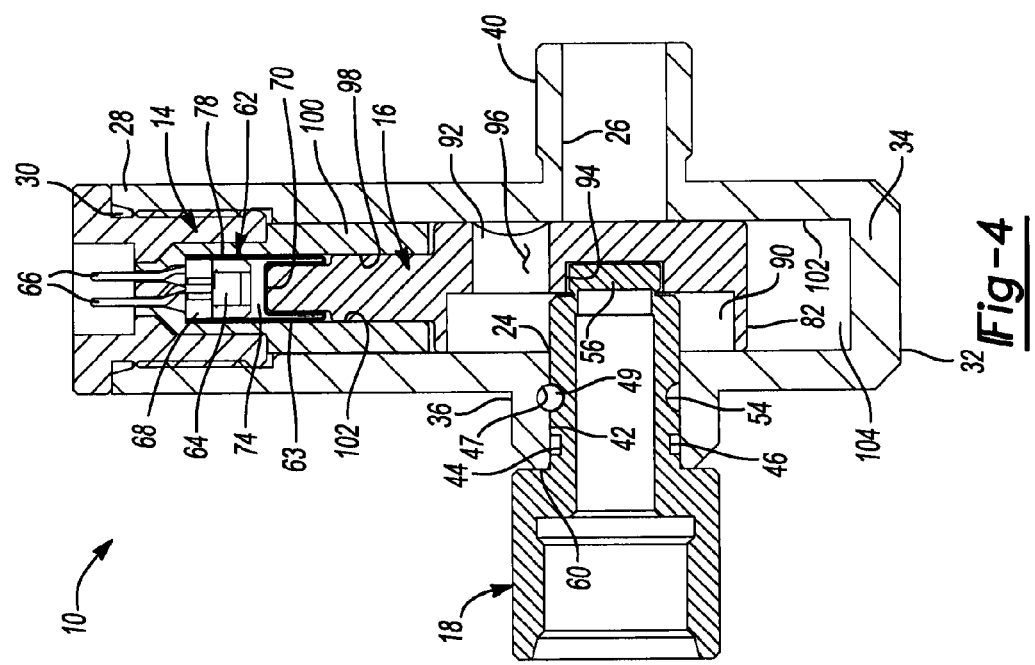
FIG. 5 is a cross-sectional view of the relief valve of FIG. 1 showing an engagement member in a deployed state.
Figure 6:
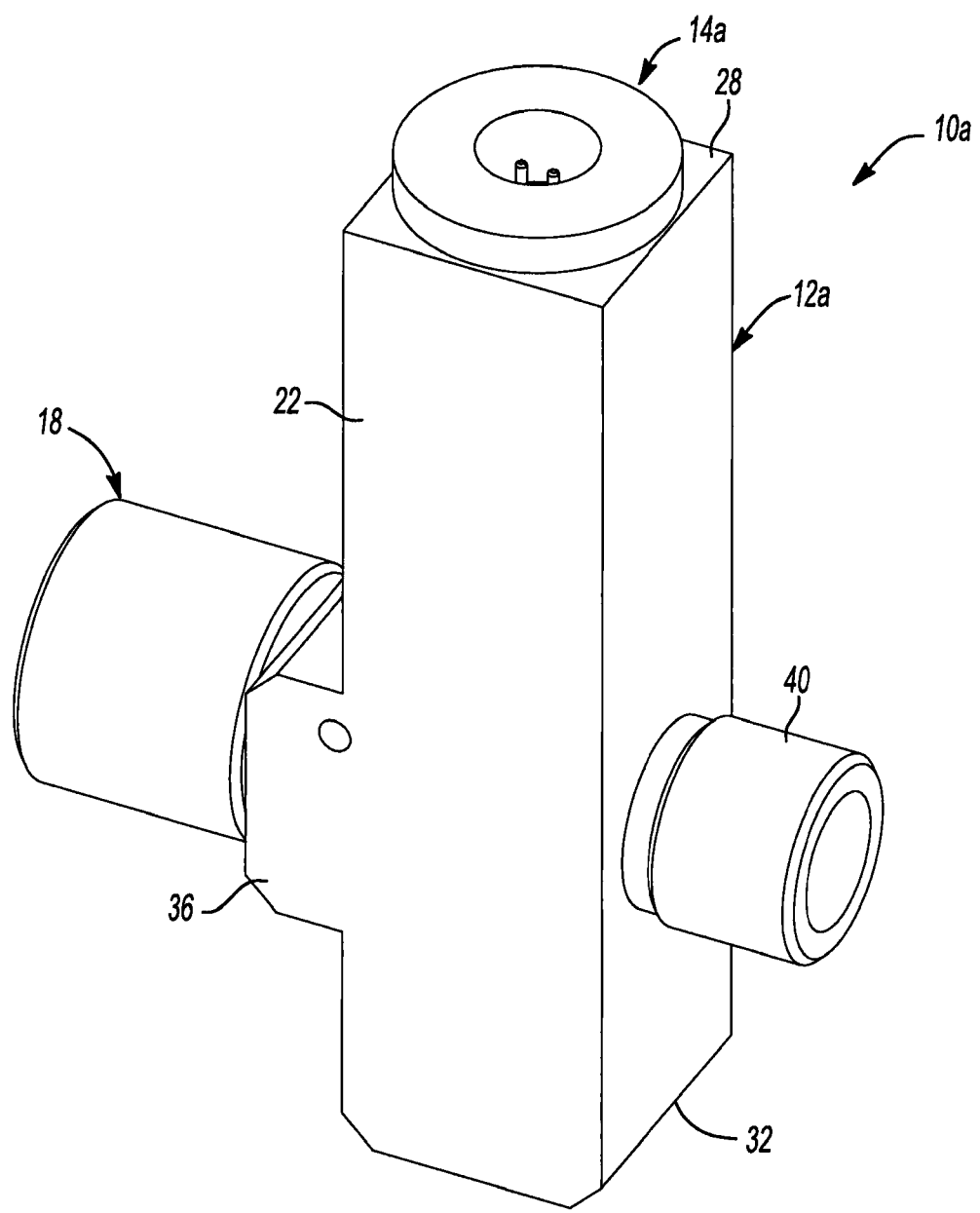
FIG. 6 is a perspective view of a relief valve in accordance with the principles of the present teachings.

In one configuration, an inner surface 42 of the port 36 includes a groove 44 that receives a sealing element 46 therein and a groove 47 that receives a retention pin 49 therein. While the inner surface 42 of the port 36 may include the groove 44, the groove 44 could alternatively or additionally be formed in an outer surface 48 of the conduit 18 (FIGS. 4 and 5). Regardless of the particular construction, the sealing element 46 may be disposed at least partially within the groove 44 to seal a junction between the inner surface 42 of the port 36 and the outer surface 48 of the conduit 18. The sealing element 46 may include at least one O-ring to seal the joint between the outer surface 48 of the conduit 18 and the inner surface 42 of the port 36. While the interface between the conduit 18 and the inner surface 42 of the port 36 is described as including a sealing element 46, the interface between the conduit 18 and the inner surface 42 of the port 36 could include more than one sealing element 46 to ensure that the interface between the outer surface 48 of the conduit 18 is sealed relative to the inner surface 42 of the port 36.

Figure 3:
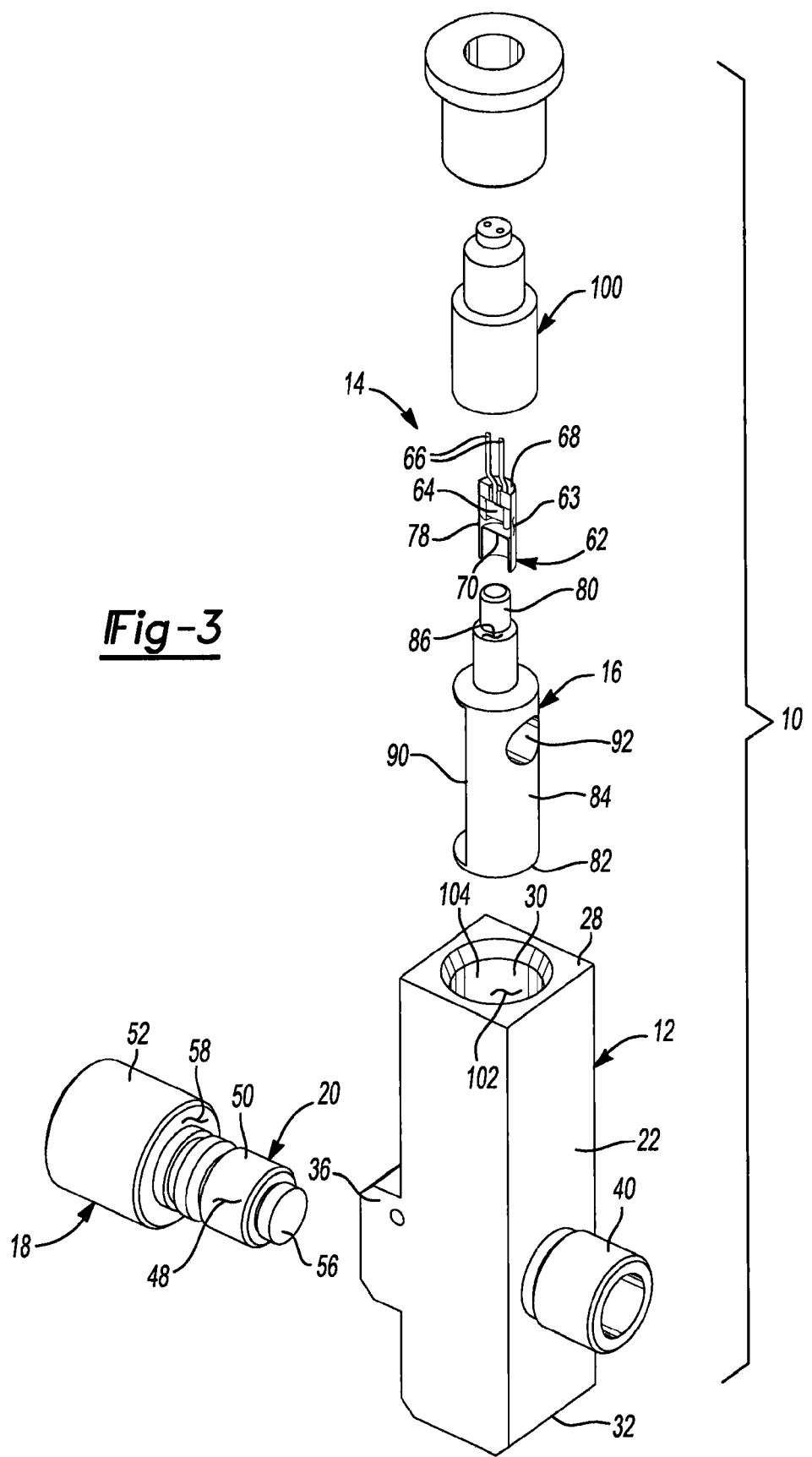
FIG. 3 is an exploded view of the relief valve of FIG. 1.

As shown in FIGS. 3-5, the end 20 of the conduit 18 may include the groove 44, a first-cylindrical section 50, a second-cylindrical section 52, a groove 54, and an end cap 56. The first-cylindrical section 50 includes the outer surface 48 and may also include the grooves 44, 54 that respectively receive the sealing element 46 and a portion of the retention pin 49 therein. The retention pin 49 cooperates with the groove 47 of the port 36 and with the groove 54 of the conduit 18 to restrict the conduit 18 from being removed from the port 36 when the conduit 18 is inserted into the port 36 and the retention pin 49 is received within the groove 47 of the port 36 and within the groove 54 of the conduit.

The second-cylindrical section 52 may be disposed adjacent to the first-cylindrical section 50 and may include a larger diameter than the first-cylindrical section 50. The larger, second-cylindrical section 52 may include an engagement surface 58 that contacts an end 60 of the port 36 to prevent over travel of the conduit 18 into the housing 12 to ensure that the end cap 56 of the conduit 18 is positioned in a predetermined relationship relative to the engagement element 16. Alternatively, the engagement surface 58 may be spaced apart and separated from the end 60 of the port 36.

As shown in FIGS. 4 and 5, the outlet port 40 is positioned relative to the inlet port 36 such that an axis extending through the inlet port 36 similarly extends through the port 40. In one configuration, an axis extending through a center of the inlet port 36 likewise extends through a center of the outlet port 40 such that the inlet port 36 is concentric with the outlet port 40. As will be described in greater detail below, aligning the inlet port 36 with the outlet port 40 such that the inlet port 36 is concentric with the outlet port 40 facilitates movement of fluid from the conduit 18 through the housing 12 and into the outlet port 40.

Figure 2:
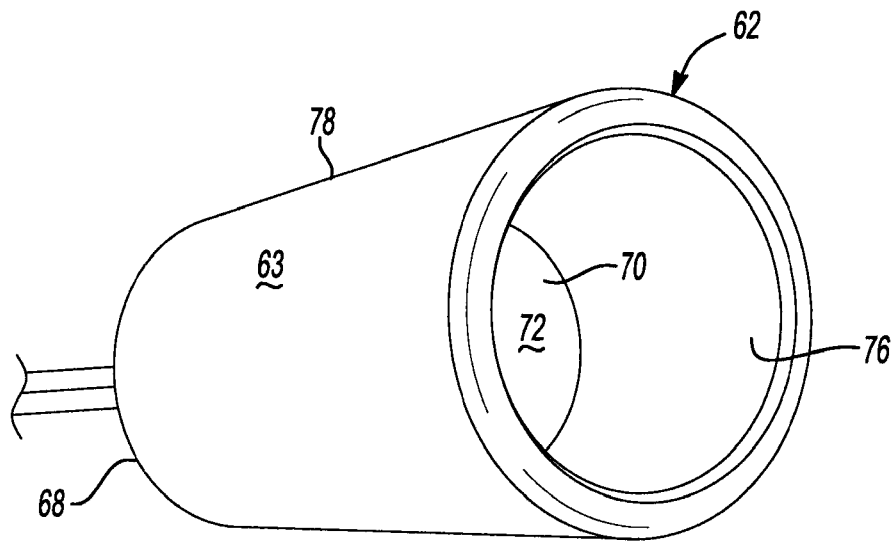
FIG. 2 is a perspective view of an initiator for use with the relief valve of FIG. 1.

The actuation device 14 may be attached to the housing 12 at the first end 28 and may include an initiator 62 (FIG. 2) and a pyrotechnic charge 64 having a pair of leads 66 electrically coupled thereto. The pyrotechnic charge 64 is ignited by supplying an electrical charge to the pyrotechnic charge 64 via at least one of the leads 66.

The initiator 62 may be disposed generally within the opening 30 of the housing 12 between the pyrotechnic charge 64 and the engagement element 16 and may include a first end 68 disposed proximate to the pyrotechnic charge 64 and a second end 70 disposed adjacent to the engagement element 16. The first end 68 of the initiator 62 is open and may receive the pyrotechnic charge 64 therein such that the pyrotechnic charge 64 is disposed generally within an interior space of the initiator 62. The second end 70 of the initiator 62 is closed and includes an engagement surface 72 in an abutting relationship with the engagement element 16.

When the initiator 62 is in a pre-deployed state (FIGS. 2 and 4), the second end 70 of the initiator 62 is drawn into an interior space 74 of the initiator 62 and forms a cavity 76. At least a portion of the engagement element 16 is received within the cavity 76 of the initiator 62 and is in an abutting relationship with the engagement surface 72.

During manufacturing of the initiator 62, walls 78 of the initiator 62 may be drawn in to bring the second end 70 of the initiator 62 within the interior space 74 of the initiator 62 and generally towards the pyrotechnic charge 64. Therefore, the initiator 62 may be referred to as a "redrawn" initiator. While the second end 70 of the initiator 62 is redrawn such that the second end 70 is moved within the interior space 74 of the initiator 62 and towards the pyrotechnic charge 64, the interior space 74 of the initiator 62 is sealed generally between the pyrotechnic charge 64 and the second end 70. Therefore, when the pyrotechnic charge 64 is ignited, the byproduct of the pyrotechnic charge 64 is contained within the interior space 74 of the initiator 62 generally between the pyrotechnic charge 64 and the second end 70 of the initiator 62. The initiator 62 may be of the type disclosed in assignee's commonly-owned U.S. Publication Numbers 2006/0027120 and 2009/0032113 and U.S. Pat. Nos. 6,907,817, 7,063,019, 7,182,191, and 7,419,184, the disclosures of which are incorporated herein by reference The engagement element 16 is slideably received within the first end 28 of the housing 12 such that the engagement element 16 is disposed generally between the actuation device 14 and the end wall 34 of the housing 12. The engagement element 16 may include a first end 80 (FIG. 3), a second end 82, and a central portion 84 disposed generally between the first end 80 and second end 82. The first end 80 may be received within the cavity 76 of the initiator 62 such that the first end 80 is in an abutting relationship with the engagement surface 72 of the second end 70 of the initiator 62. As such, the walls 78 of the initiator 62 at least partially axially surround the first end 80 of the engagement element 16 when the initiator 62 is in the pre-deployed state (FIG. 4).

When the walls 78 of the initiator 62 are drawn to form the cavity 76 of the initiator 62 and the first end 80 of the engagement element 16 is disposed within the cavity 76, the first end 80 may cooperate with the folded walls 78 to provide the initiator 62 with a substantially constant outer diameter. Specifically, the first end 80 of the engagement element 16 may include a reduced-diameter when compared to the central portion 84 of the engagement member 16 to allow the walls 78 of the initiator 62 to be folded and positioned over the first end 80 such that the diameter of the first end 80 in combination with the thickness of the folded walls 78 is substantially equal to the diameter of the central portion 84 of the engagement element 16.

The first end 80 may also include a length that is substantially equal to a length of the cavity 76 such that the walls 78 of the initiator 62 engage a contact surface 86 of the engagement element 16. The contact surface 86 may be disposed at a junction between the first end 80 and the central portion 84 of the engagement element 16 and may extend substantially perpendicular to an outer surface 88 of the engagement element 16.

The second end 82 is disposed on an opposite end of the engagement element 16 from the first end 80 with the central portion 84 disposed therebetween. The central portion 84 may include a recess 90, a bore 92, and a pocket 94. The recess 90 is disposed generally between the first end 80 and the second end 82 of the engagement element 16 and provides a clearance between the first-cylindrical section 50 of the conduit 18 and the engagement element 16 to allow the engagement element 16 to move relative to the conduit 18 during and after shearing of the end cap 56 from the conduit 18.

The bore 92 is in fluid communication with the recess 90 and includes an inner surface 96 having a diameter that may be at least equal to an inner diameter of the conduit 18. The bore 92 is in selective communication with the conduit 18 when the end cap 56 is sheared from the conduit 18 and the engagement element 16 is sufficiently moved relative to the conduit 18 to align the bore 92 with the conduit 18 and with the outlet port 40.

The pocket 94 may be disposed adjacent to the recess 90 and may include a shape that matingly engages the end cap 56 when the conduit 18 is inserted into the housing 12. During assembly, when the end 20 of the conduit 18 is inserted into the housing 12 at the inlet port 36, the conduit 18 is permitted to move into the housing 12 until the engagement surface 58 of the second-cylindrical section 52 contacts the end 60 of the port 36. Once fully inserted into the housing 12, the end cap 56 is properly positioned relative to the central portion 84 of the engagement element 16 such that the end cap 56 is matingly received within the pocket 94 of the engagement element 16.

In one configuration, the end cap 56 is tightly fit into the pocket 94 such that the end cap 56 is fixed for movement with the engagement element 16 relative to the housing 12. In another configuration a slight gap may exist between an outer surface of the end cap 56 and an inner surface of the pocket 94 to permit slight movement of the engagement element 16 relative to the end cap 56 to prevent inadvertent damage to and/or shearing of the end cap 56. Preventing inadvertent damage to and/or shearing of the end cap 56 ensures that the end cap 56 properly seals the conduit 18 until the actuation device 14 causes the engagement element 16 to move relative to the housing 12.

With particular reference to FIGS. 4 and 5, operation of the relief-valve assembly 10 will be described in detail. When the relief-valve assembly 10 is in a pre-deployed state (FIG. 4), the second end 70 of the initiator 62 is in close proximity to the pyrotechnic charge 64 such that the cavity 76 is substantially filled with the first end 80 of the engagement element 16. In this position, the first end 80 of the engagement element 16 is in contact with the engagement surface 72 of the initiator 62 and may be in contact with the walls 78 of the initiator 62 at a point where the walls 78 are redrawn. In this position, the end cap 56 is attached to the conduit 18 and the conduit 18 is fluidly isolated from an interior of the housing 12.

A force may be applied to the engagement element 16 to move the engagement element 16 from a retracted or pre-deployed position (FIG. 4) to an extended or deployed position (FIG. 5) to shear the end cap 56 from the conduit 18 and place the conduit 18 in fluid communication with an interior of the housing 12 and with the outlet port 40 via bore 92. Movement of the engagement element 16 is accomplished by supplying an electrical charge to the pyrotechnic charge 64 via leads 66. The electrical charge ignites the pyrotechnic charge 64, thereby causing an increase in pressure within the interior space 74 of the initiator 62. The increase in pressure within the interior space 74 of the initiator 62 applies a force to the walls 78 of the initiator 62.

Because an outer surface 63 of the initiator 62 is in an abutting relationship with an inner surface 98 of a fitting 100 of the actuation device 14, the force applied to the walls 78 does not cause radial deformation of the walls 78 of the initiator 62, as the walls 78 are supported by the inner surface 98 of the fitting 100. However, the second end 70 is not supported by the fitting 100 and is therefore moved relative to the housing 12 when the pressure within the interior space 74 is increased by initiation of the actuation device 14.

Movement of the second end 70 of the initiator 62 relative to the housing 12 causes concurrent movement of the engagement element 16 relative to the housing 12, as the engagement element 16 is in an abutting relationship with the second end 70 of the initiator 62. Sufficient movement of the engagement element 16 by the second end 70 of the initiator 62 causes the pocket 94 of the engagement element 16 to apply a force to the end cap 56 of the conduit 18. Because the pyrotechnic charge 64 causes a rapid increase in pressure within the interior space 74 of the initiator 62, movement of the engagement element 16 towards the conduit 18 is very rapid. Such rapid movement of the engagement member 16 in combination with the tolerance between an exterior surface of the end cap 56 and an interior surface of the pocket 94 causes the engagement element 16 to shear the end cap 56 from the conduit 18 and place the conduit 18 in fluid communication with an interior of the housing 12 and with the outlet port 40 via bore 92.

While the outer surface 63 of the initiator 62 is described as being supported by an inner surface 98 of a fitting 100, the outer surface 63 of the initiator 62 could be indirect contact with an inner surface 102 of the housing 12 defined by a bore 104 extending through the housing 12 generally between the first end 28 and the second end 32. In such a configuration, the outer surface 63 of the initiator 62 is sized such that the outer surface 63 is in contact with or in close proximity to the inner surface 102 of the bore 104. As such, when the pressure within the interior space 74 of the initiator 62 is increased by initiation of the activation device 14, radial deformation of the walls 78 of the initiator 62 is prevented while movement of the second end 70 relative to the housing 12 is permitted.

In either of the foregoing configurations, the outer surface 63 of the initiator 62 is in close proximity to or in contact with an inner surface 98 of a fitting 100 or with an inner surface 102 of a bore 104 formed through the housing 12. As such, the initiator 62 includes a substantially constant cross-sectional diameter. When the walls 78 are drawn into the interior space 74 of the initiator 62, the walls 78 disposed within the interior space 74 are substantially parallel to the walls 78 that are in close proximity to or contact with the inner surface 98 of the fitting 100 or the inner surface 102 of the bore 104. As such, when the pressure within the interior space 74 of the initiator 62 is increased such that the second end 70 of the initiator 62 moves relative to the housing 12 and causes the walls 78 to unfold, the walls 78 disposed within the interior space 74 move from the interior space 74 and into close proximity to either of the inner surface 98 of the fitting 100 or the inner surface 102 of the bore 104.

As described above, a slight gap may exist between an interior surface of a pocket 94 and an exterior surface of the end cap 56 to allow slight movement of the engagement element 16 relative to the end cap 56 of the conduit 18. If such a slight tolerance exists, the engagement element 16 must move a slight distance relative to the housing 12 prior to shearing the end cap 56 from the conduit 18. However, if the interior surface of the pocket 94 is in contact with the exterior surface of the end cap 56, once the engagement element 16 is moved relative to the housing 12, a force is applied to the end cap 56 to immediately begin shearing of the end cap 56 from the conduit 18. In either of the foregoing configurations, once the end cap 56 is sheared from the conduit 18, the end cap 56 may be retained generally within the pocket 94 of the engagement element 16 or may be dislodged from the pocket 94 and fall generally within the recess 90 of the engagement element 16.

Movement of the engagement element 16 relative to the housing 12 continues until the second end 82 of the engagement element 16 contacts the second end 32 of the housing 12. The distance between the second end 82 (FIG. 3) of the engagement element 16 and the bore 92 extending through the engagement element 16 is labeled X in FIG. 5 and generally dictates the position of the bore 92 relative to the inlet port 36 and the outlet port 40 once movement of the engagement element 16 is stopped due to engagement between the second end 82 of the engagement element 16 and the second end 32 of the housing 12.

The distance X is chosen such that when the second end 82 of the engagement element 16 is in contact with the second end 32 of the housing 12, a center of the bore 92 is substantially aligned with the center of the inlet port 36 and a center of the outlet port 40. Aligning the centers of the bore 92, the inlet port 36, and the outlet port 40, likewise aligns the centers of the bore 92 and the outlet port 40 with the center of the conduit 18. Aligning the inlet port 36, the outlet port 40, the bore 92, and the conduit 18 in such a fashion allows for quick exhaustion of the fluid disposed within the conduit 18 through the housing 12 via the outlet port 40.

With particular reference to FIGS. 6-9, another relief-valve assembly 10a is provided. In view of the substantial similarity in structure and function of the components associated with the relief-valve assembly 10 with respect to the relief-valve assembly 10a, like reference numerals are used hereinafter and in the drawings to identify like components while like reference numerals containing letter extensions are used to identify those components that have been modified.

As with the relief-valve assembly 10, the relief-valve assembly 10a may include a housing 12a, an actuation device 14a, and an engagement element 16a. A conduit 18 may be received generally within the housing 12a and may be placed in communication with an interior of the housing 12a when the engagement element 16a is sufficiently moved relative to the housing 12a to shear an end cap 56 of the conduit 18.

The housing 12a includes an inlet port 36 and an outlet port 40. The inlet port 36 receives the conduit 18 such that the end cap 56 of the conduit 18 extends into the housing 12a. The outlet port 40 may be positioned relative to the inlet port 36 such that the center of the outlet port 40 is substantially concentric with the inlet port 36 and, thus, is aligned with the center of the conduit 18.

The actuation device 14a may be received at the first end 28 of the housing 12a and may be received within an opening 30 thereof. The actuation device 14a may include an initiator 62a, a pyrotechnic charge 64, and a series of leads 66. The actuation device 14a may selectively supply an interior space of the housing 12a with an increase in pressure caused by ignition of the pyrotechnic charge 64 to selectively apply a force on the engagement element 16a, as will be described further below. As with the initiator 62, the pyrotechnic charge 64 is ignited by supplying an electrical charge to the pyrotechnic charge 64 via at least one of the leads 66.

The engagement element 16a is slideably received within the housing 12a and may include at least one sealing element 106 disposed within a groove 108 formed around an outer perimeter of a first end 80a of the engagement element 16a. A pair of sealing elements 106 may be disposed within respective grooves 108 to further seal an outer surface 103 of the engagement element 16a relative to an inner surface 102 of the housing 12a. The engagement element 16a may also include an engagement surface 110 that generally opposes the actuation device 14a. The engagement surface 110 may be spaced apart and separated from the actuation device 14a such that a gap 112 is defined generally between the engagement surface 110 of the engagement element 16a, the actuation device 14a, and the inner surface 102 of the bore 104 extending through the housing 12a.

With particular reference to FIGS. 8 and 9, operation of the relief-valve assembly 10a will be described. When the relief-valve assembly 10a is in a pre-deployed state (FIG. 8), the engagement surface 110 of the engagement element 16a is disposed proximate to the first end 28 of the housing 12a. In this position, the gap 112 disposed generally between the actuation device 14a and the engagement surface 110 of the engagement element 16a is smaller when compared to the gap 112 disposed between the engagement surface 110 and the actuation device 14a when the engagement element 16a is in the deployed state (FIG. 9).

A force may be applied to the engagement element 16a to move the engagement element 16a from a retracted or pre-deployed position (FIG. 8) to an extended or deployed position (FIG. 9) to shear the end cap 56 from the conduit 18 and place the conduit 18 in fluid communication with an interior of the housing 12a and with the outlet port 40 via bore 92. Movement of the engagement element 16a relative to the housing 12a is accomplished by supplying an electrical charge to the pyrotechnic charge 64 via leads 66. The electrical charge ignites the pyrotechnic charge 64 causing an increase in pressure within the bore 104 of the housing 12a disposed generally between the actuation device 14a and the engagement surface 110 of the engagement element 16a. Upon sufficient increase in pressure within the bore 104 of the housing 12a between the actuation device 14a and the engagement surface 110 of the engagement element 16a, the engagement element 16a will move relative to the housing 12a such that the gap 112 between the actuation device 14a and the engagement surface 110 of the engagement element 16a increases and the engagement element 16a shears the end cap 56 from the conduit 18.

As described above with respect to the relief-valve assembly 10, shearing the end cap 56 from the conduit 18 places the conduit 18 in fluid communication with an interior of the housing 12a as well as with the outlet port 40 via the bore 92 formed through the engagement element 16a. Once the end cap 56 is sheared from the conduit 18, the end cap 56 may remain within the pocket 94 of the engagement element 16a or, alternatively, may be dislodged from the pocket 94 and be positioned within the recess 90 of the engagement element 16a.

Figure 10:
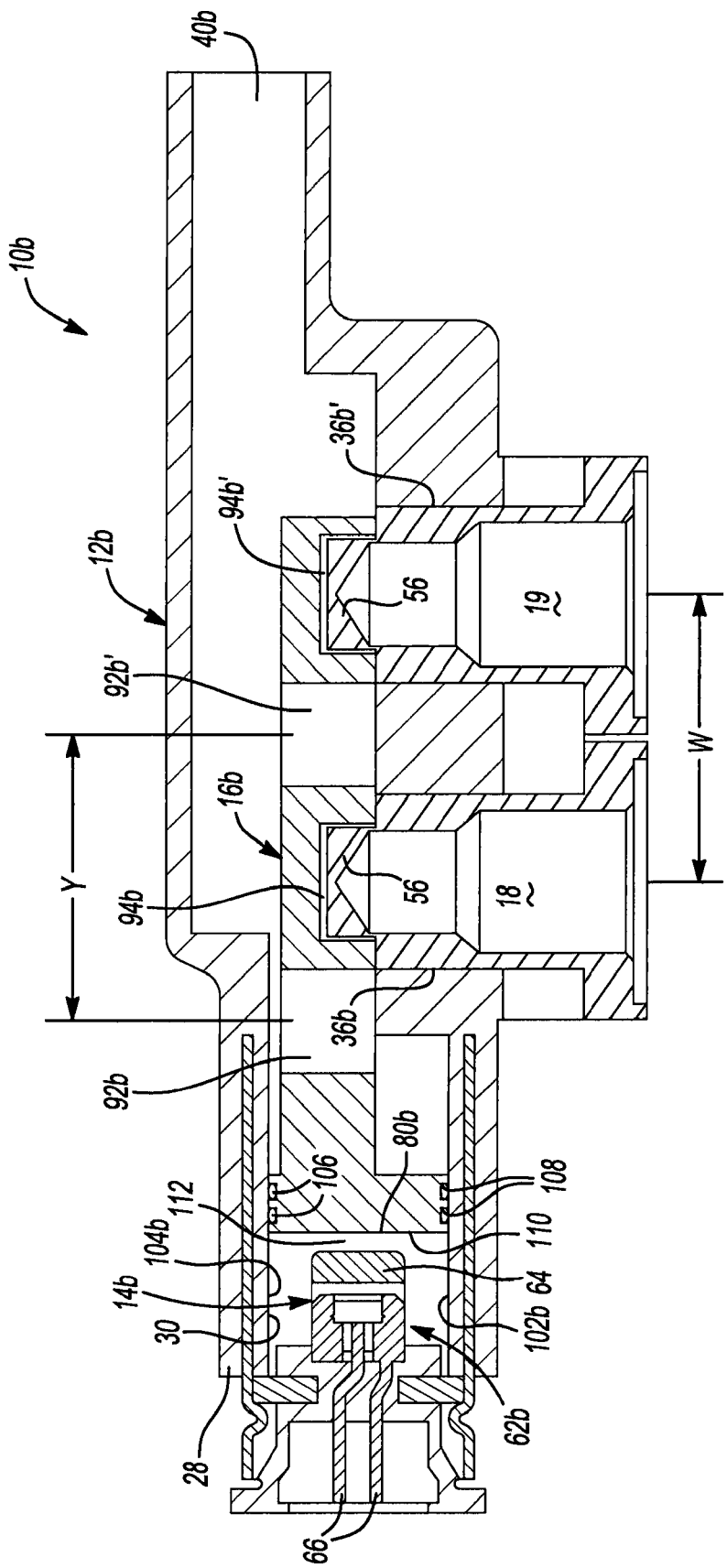
FIG. 10 is a cross-sectional view of a relief valve in accordance with the principles of the present teachings and in a pre-deployed state.
Figure 11:
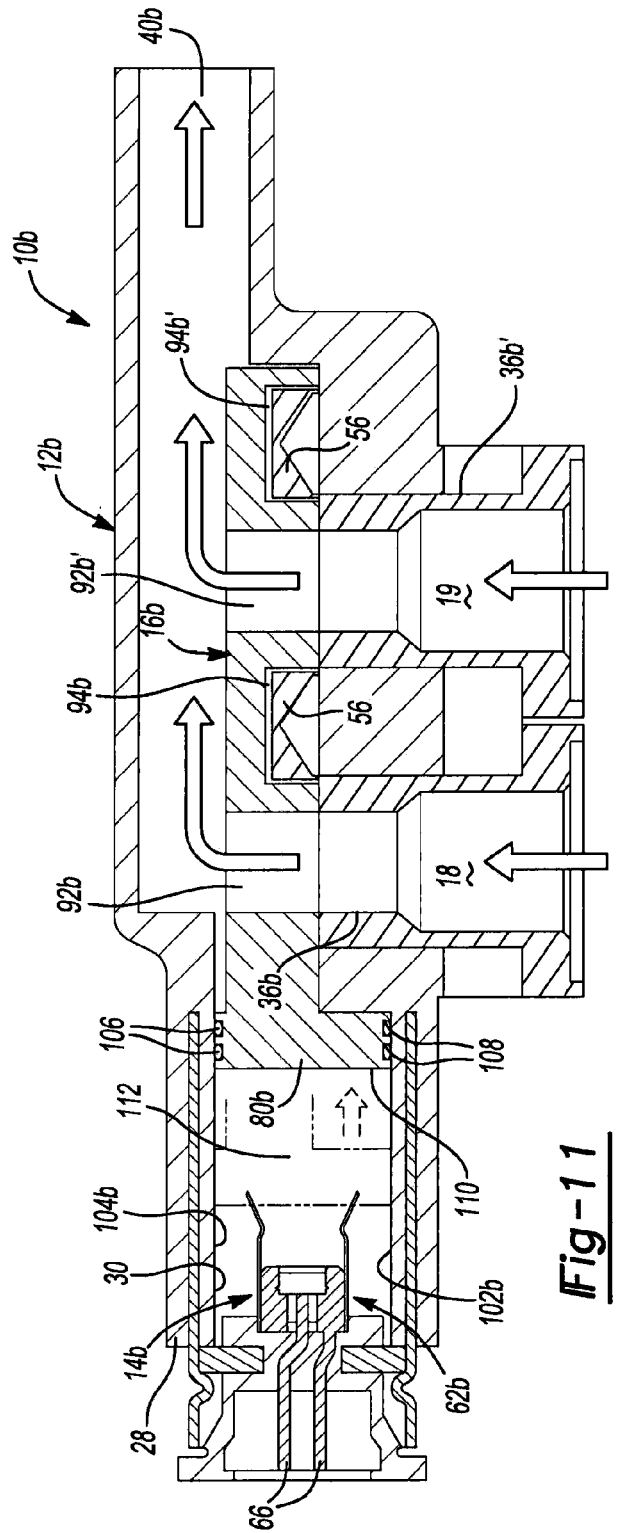
FIG. 11 is a cross-sectional view of the relief valve of FIG. 10 in a deployed state.

With particular reference to FIGS. 10 and 11, another relief-valve assembly 10b is provided. In view of the substantial similarity in structure and function of the components associated with the relief-valve assembly 10 with respect to the relief-valve assembly 10b, like reference numerals are used hereinafter and in the drawings to identify like components while like reference numerals containing letter extensions are used to identify those components that have been modified.

As with the relief-valve assembly 10, the relief-valve assembly 10b may include a housing 12b, an actuation device 14b, and an engagement element 16b. A pair of conduits 18, 19 may be received generally within the housing 12b and may be placed in communication with an interior of the housing 12b when the engagement element 16b is sufficiently moved relative to the housing 12b to shear end caps 56 respectively associated with the conduits 18, 19. While a pair of conduits 18, 19 is disclosed, more than two conduits could extend into the housing 12b.

The housing 12b includes a pair of inlet ports 36b, 36b' and an outlet port 40b. The inlet ports 36b, 36b' respectively receive the conduits 18, 19 such that the end caps 56 of the respective conduits 18, 19 extend into the housing 12b. The outlet port 40b may be positioned relative to the inlet ports 36b, 36b' such that a longitudinal axis of the outlet port 40b is substantially perpendicular to the inlet ports 36b, 36b' (FIGS. 10 and 11). Alternatively, the outlet port 40b may be positioned relative to the inlet ports 36b, 36b' such that the longitudinal axis of the outlet port 40b is substantially parallel to the inlet ports 36b, 36b' (not shown).

The actuation device 14b may be received at the first end 28 of the housing 12b and may be at least partially received within an opening 30 thereof. The actuation device 14b may include an initiator 62b, a pyrotechnic charge 64, and a series of leads 66. The actuation device 14b may selectively supply an interior space of the housing 12b with an increase in pressure caused by ignition of the pyrotechnic charge 64 to selectively apply a force on the engagement element 16b, as will be described further below. As with the initiators 62, 62a, the pyrotechnic charge 64 is ignited by supplying an electrical charge to the pyrotechnic charge 64 via at least one of the leads 66. While the initiator 62b will be described and shown as being of a similar construction as the initiator 62a, the initiator 62b could alternatively include a "redrawn" construction, as described above and shown in relation to FIGS. 1-5.

The engagement element 16b is slideably received within the housing 12b and may include at least one sealing element 106 disposed within grooves 108 formed around an outer perimeter of a first end 80b of the engagement element 16b to seal an outer surface of the engagement element 16b relative to an inner surface 102b of the housing 12b. The engagement element 16b may also include an engagement surface 110 that generally opposes the actuation device 14b. The engagement surface 110 may be spaced apart and separated from the actuation device 14b such that a gap 112 is defined generally by the engagement surface 110 of the engagement element 16b, the actuation device 14b, and the inner surface 102 of a bore 104b extending through the housing 12b.

The engagement element 16b may also include a pair of bores 92b, 92b' extending therethrough. The bores 92b, 92b' are spaced apart from one another a distance Y, which is substantially equal to a distance W measured between a central axis of the inlet port 36b and a central axis of the inlet port 36b' (FIG. 10).

The engagement element 16b may also include a pair of pockets 94b, 94b' that receive respective end caps 56 of the conduits 18, 19. As with the bores 92b, 92b', the pockets 94b, 94b' are similarly spaced apart from one another the distance Y to align the pockets 94b, 94b' with the conduits 18, 19 and permit the end caps 56 of the conduits 18, 19 to be respectively received within the pockets 94b, 94b'.

While the pockets 94b, 94b' are described as being spaced apart at a distance substantially equal to a distance between the inlet ports 36b, 36b' of the housing 12b, the pockets 94b, 94b' could alternatively include a different spacing such that the pockets 94b, 94b' are offset from the inlet ports 36b, 36b'. Offsetting the pockets 94b, 94b' in this manner allows one of the pockets 94b, 94b' to contact one of the end caps 56 before the other of the pockets 94b, 94b' contacts the other end cap 56 to reduce the shear load applied to the engagement element 16b when the engagement element 16b moves relative to the housing 12b.

With particular reference to FIGS. 10 and 11, operation of the relief-valve assembly 10b will be provided. When the relief-valve assembly 10b is in a pre-deployed state (FIG. 10), the engagement surface 110 of the engagement element 16b is disposed proximate to the first end 28 of the housing 12b. In this position, the gap 112 disposed generally between the actuation device 14b and the engagement surface 110 of the engagement element 16b is smaller when compared to the gap 112 disposed between the actuation device 14b and the engagement surface 110 when the engagement element 16b is in the deployed state (FIG. 11).

A force may be applied to the engagement element 16b to move the engagement element 16b from a retracted or pre-deployed position (FIG. 10) to an extended or deployed position (FIG. 11) to shear the end caps 56 from the conduits 18, 19 and place the conduits 18, 19 in fluid communication with an interior of the housing 12b and with the outlet port 40b via bores 92b, 92b'. Movement of the engagement element 16b relative to the housing 12b is accomplished by supplying an electrical charge to the pyrotechnic charge 64 via leads 66. The electrical charge ignites the pyrotechnic charge 64 causing an increase in pressure within the bore 104b of the housing 12b disposed generally between the actuation device 14b and the engagement surface 110 of the engagement element 16b. Upon sufficient increase in pressure within the bore 104b of the housing 12b between the engagement element 16b and the actuation device 14b, the engagement element 16b will move relative to the housing 12b such that the gap 112 between the engagement element 16b and the actuation device 14b increases and the engagement element 16b shears the end caps 56 from the conduits 18, 19.

Shearing the end caps 56 from the conduits 18, 19 places the conduits 18, 19 in fluid communication with an interior of the housing 12b as well as with the outlet port 40b via the bores 92b, 92b' formed through the engagement element 16b. Once the end caps 56 are sheared from the conduits 18, 19, the end caps 56 may remain within the pockets 94b, 94b' of the engagement element 16b. While the engagement element 16b is described and shown as including a pair of bores 92b, 92b', the engagement element 16b may include at least one more bore to shear an additional end cap from an additional conduit extending into the housing 12b.

Figure 12:
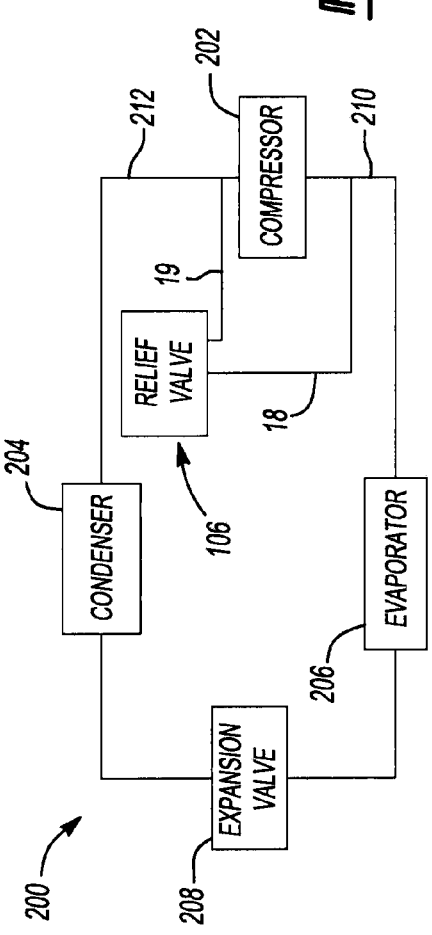
FIG. 12 is a schematic representation of a refrigeration system incorporating the relief valve of FIG. 10.

With particular reference to FIG. 12, the relief-valve assembly 10b is shown incorporated into a refrigeration system 200. The refrigeration system 200 may include a compressor 202, a condenser 204, an evaporator 206, and an expansion valve 208 cooperating to form a closed-loop system circulating a fluid such as, for example, refrigerant, amongst the components 202, 204, 206, 208 of the system 200.

In operation, the compressor 202 receives suction-pressure, vapor refrigerant from the evaporator 206 and increases the pressure of the vapor refrigerant to discharge pressure.

The discharge-pressure refrigerant exits the compressor 202 and enters the condenser 204. In the condenser 204, the discharge-pressure refrigerant changes phase from a vapor to a liquid prior to encountering the expansion valve 208. The liquid refrigerant is expanded by the expansion valve 208 prior to entering the evaporator 206 where the liquid refrigerant changes phase once again from a liquid to a vapor. In so doing, the vapor refrigerant returns to suction pressure and is received by the compressor 202 to begin the cycle anew.

As described above, the refrigerant is received by the compressor 202 from the evaporator 206 at suction pressure and the compressor 202 compresses the refrigerant and supplies the condenser 206 with discharge-pressure refrigerant, which is at an elevated pressure when compared to the suction-pressure refrigerant received from the evaporator 206. A conduit 210 may extend from an outlet of the evaporator 206 to an inlet of the compressor 202 to supply the compressor 202 with suction-pressure refrigerant. Similarly, a conduit 212 may extend from an outlet of the compressor 202 to an inlet of the condenser 204 with discharge-pressure refrigerant.

The relief-valve assembly 10 may be incorporated into the refrigeration system 200 to selectively vent the refrigerant within the conduits 210, 212. Specifically, the conduit 18 may be fluidly coupled to the conduit 210 while the conduit 19 may be fluidly coupled to the conduit 212. As such, the conduit 18 receives suction-pressure refrigerant from the conduit 210 and is at substantially suction pressure while the conduit 19 receives discharge-pressure refrigerant from the conduit 212 and is substantially at discharge pressure.

When an electrical charge is supplied to the leads 66 of the relief-valve assembly 10b, the pyrotechnic charge 64 is ignited, thereby causing the engagement member 16b to shear the end caps 56 from the respective conduits 18, 19, as described above. Shearing the end caps 56 vents the fluid disposed within the conduits 18, 19 and causes the fluid to exit the conduits 18, 19 via the outlet port 40b. Venting the conduits 18, 19 likewise vents the conduits 210, 212 of the refrigeration system 200, as the conduits 18, 19 are in fluid communication with the conduits 210, 212. As described, the relief-valve assembly 10b simultaneously vents the low-pressure side of the refrigeration system 200 (i.e., conduit 210), as well as the high-pressure side of the refrigeration system 200 (i.e., conduit 212). Simultaneously, shearing the end caps 56 from the conduits 18, 19 obviates the need for use of multiple valves to vent the low-side and the high-side of the refrigeration system 200.

With particular reference to FIG. 13, the relief-valve assembly 10b and refrigeration system 200 are shown incorporated into a HVAC system 114 of a vehicle 116. While the HVAC system 114 will be shown and described as incorporating the relief-valve assembly 10b, the HVAC system 114 could alternatively or additionally include the relief-valve assemblies 10, 10a. As described above, incorporating the relief-valve assembly 10b provides the advantage of simultaneously venting a high-pressure side and a low-pressure side of the refrigeration system 200.

The HVAC system 114 includes the compressor 202, the condenser 204, the evaporator 206, and the expansion valve 208. The relief-valve assembly 10 is positioned relative to the system 114 such that the end caps 56 of the conduits 18, 19 are disposed within the housing 12b. The relief-valve assembly 10b may be disposed generally within an engine compartment 124 to prevent fluid communication of a fluid disposed within the system 200 with a passenger compartment 126 if the engagement element 16b shears the end caps 56 from the conduits 18, 19.

The relief-valve assembly 10 may be in communication with a control module 128 such as a body controller 130 and/or a safety-system controller 132. In either configuration, the leads 66 are electrically coupled to the control module 128 to allow the control module 128 to selectively supply an electrical current to the pyrotechnic charge 64 via the leads 66 to control movement of the engagement element 16b from the retracted or pre-deployed position to the extended or deployed position.

If the control module 128 includes the safety-system controller 132, the control module 128 may be in communication with a sensor assembly that monitors operating parameters of the vehicle 116. For example, the sensor assembly may include a refrigerant-detecting sensor 134 disposed within the passenger compartment 126 and/or an airbag sensor 136 that detects a vehicle crash event.

While the control module 128 may be in communication with a refrigerant-detecting sensor 134 and/or an airbag sensor 136, operation of the relief-valve assembly 10b will be described in conjunction with a system including both a refrigerant-detecting sensor 134 and an airbag sensor 136.

If the refrigerant-detecting sensor 134 detects a refrigerant leak within the passenger compartment 126, the control module 128 may send a signal to the pyrotechnic charge 64 to initiate the pyrotechnic charge 64 via the leads 66. As described above, supplying electrical charge to the leads 66 of the pyrotechnic charge 64 causes the pyrotechnic charge 64 to ignite and cause movement of the engagement element 16b relative to the housing 12b. Sufficient movement of the engagement element 16b relative to the housing 12b causes the engagement element 16b to shear the end caps 56 from the conduits 18, 19, thereby placing an interior of the conduits 18, 19 in fluid communication with the housing 12b and with the outlet port 40b via bores 92b, 92b'. Once the end caps 56 are removed from the conduits 18, 19, fluid disposed within the conduits 18, 19 is permitted to escape the conduits 18, 19 and HVAC system 114 and related components 118, 120, 122 and vent through the housing 12b and into the outlet port 40b.

If the airbag sensor 136 detects an impact event, the control module 128 may similarly send a signal to the pyrotechnic charge 64 via the leads 66 to ignite the pyrotechnic charge 64. As previously described, ignition of the pyrotechnic charge 64 causes movement of the engagement element 16b relative to the housing 12b and causes the engagement element 16b to shear the end caps 56 from the conducts 18, 19. Venting fluid disposed within the conduits 18, 19 and the components of the HVAC system 114 into the engine compartment 124 of the vehicle 116 prevents such fluid from entering the passenger compartment 126.

A tube 138 may be attached to the housing 12b at the outlet port 40b to place the outlet port 40b of the housing 12b in fluid communication with a particular area of the engine compartment 124. For example, the tube 138 may extend from the outlet port 40b of the housing 12b and to a wheel well 140, for example. Therefore, if the control module 128 causes the pyrotechnic charge 64 to fire and the engagement element 16b to shear the end caps 56 from the conduits 18, 19, refrigerant from the conduits 18, 19 and HVAC system 114 will be vented to an area proximate the wheel well 140.

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. A relief valve comprising:
   a housing including a first inlet port and a second inlet port;
   an initiator associated with said housing; and
   an engagement member slideably disposed within said housing and moveable between a retracted position and an extended position under force of said initiator, said engagement member including a first bore aligned with said first inlet port in said extended position and a second bore aligned with said second inlet port in said extended position;
   wherein said engagement member includes a first pocket and a second pocket, said first pocket spaced apart from said second pocket by a first distance and said first port spaced apart from said second port by a distance different than said first distance.

2. The relief valve of claim 1, further comprising an outlet port, said first inlet port and said second inlet port in fluid communication with said outlet port when said engagement member is in said extended position.

3. The relief valve of claim 1, wherein said first inlet port is spaced apart from said second inlet port by a first distance and said first bore is spaced apart from said second bore by substantially said first distance.

4. The relief valve of claim 1, wherein said initiator is disposed at least partially within said housing.

5. The relief valve of claim 1, wherein said engagement member includes at least one sealing element disposed between an outer surface of said engagement member and an inner surface of said housing.

6. A relief valve comprising:
   a housing including a first inlet port and a second inlet port; and
   an engagement member disposed within said housing and moveable in a direction between a retracted position and an extended position under force of an initiator, said engagement member including a first bore aligned with said first inlet port in said extended position and a second bore aligned with said second inlet port in said extended position;
   wherein the first and second inlet ports are spaced apart from one another in the direction in which the engagement member is moveable within said housing,
   wherein said engagement member includes a first pocket and a second pocket, said first pocket spaced apart from said second socket by a first distance and said first port spaced apart from said second port by a distance different than said first distance.

* * * * *